(12) United States Patent
Kato

(10) Patent No.: US 10,577,038 B2
(45) Date of Patent: Mar. 3, 2020

(54) WIRE HARNESS MODULE AND WIRE HARNESS MODULE MANAGEMENT SYSTEM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shigeto Kato, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/561,266

(22) PCT Filed: Mar. 30, 2016

(86) PCT No.: PCT/JP2016/060300
§ 371 (c)(1),
(2) Date: Sep. 25, 2017

(87) PCT Pub. No.: WO2016/159040
PCT Pub. Date: Oct. 6, 2016

(65) Prior Publication Data
US 2018/0118293 A1    May 3, 2018

(30) Foreign Application Priority Data
Mar. 30, 2015  (JP) ................... 2015-068979

(51) Int. Cl.
*B62D 65/02* (2006.01)
*B60R 16/02* (2006.01)
(Continued)

(52) U.S. Cl.
CPC ............ *B62D 65/024* (2013.01); *B60R 16/02* (2013.01); *B60R 16/0207* (2013.01);
(Continued)

(58) Field of Classification Search
CPC . B60R 16/02; B60R 16/0207; B60R 16/0215; B62D 65/024; H01B 7/368;
(Continued)

(56) References Cited

U.S. PATENT DOCUMENTS

2007/0120684 A1    5/2007  Utaka et al.

FOREIGN PATENT DOCUMENTS

JP    04-328208       11/1992
JP    2000322939 A *  11/2000
(Continued)

OTHER PUBLICATIONS

Translation of JP2015125898A (Hamashima) & JP2000322939A (Okawa) (Year: 2000).*
(Continued)

*Primary Examiner* — Rexford N Barnie
*Assistant Examiner* — Elim Ortiz
(74) *Attorney, Agent, or Firm* — Greenblum & Bernstein, P.L.C.

(57) ABSTRACT

A technique for facilitating automation of fitting a wire harness to a vehicle is provided. A wire harness module includes a wire harness formed in a packed shape. Connectors each attached to an end of the wire harness are attached to specific positions on the wire harness. Fixtures for fixing the wire harness to the vehicle are attached to specific positions on the wire harness. Identification information
(Continued)

unique to the wire harness is recorded in a tag. The identification information is used when acquiring attachment position information, which indicates the positions at which the connectors and fixtures are attached.

4 Claims, 4 Drawing Sheets

(51) Int. Cl.
*H01R 13/46* (2006.01)
*H01B 7/36* (2006.01)
*H02G 1/00* (2006.01)
*H02G 3/00* (2006.01)

(52) U.S. Cl.
CPC ......... *B60R 16/0215* (2013.01); *H01B 7/368* (2013.01); *H01R 13/465* (2013.01); *H02G 1/00* (2013.01); *H01R 2201/26* (2013.01); *H02G 3/00* (2013.01)

(58) Field of Classification Search
CPC .... H01R 13/465; H01R 2201/26; H02G 1/00; H02G 3/00
See application file for complete search history.

(56) References Cited

FOREIGN PATENT DOCUMENTS

| JP | 3121534 | 4/2006 |
|----|---------|--------|
| JP | 2007-140886 | 6/2007 |
| JP | 2013-153568 | 8/2013 |
| JP | 2015125898 A * | 7/2015 |

OTHER PUBLICATIONS

Search Report issued in International Bureau of WIPO Patent Application No. PCT/JP2016/060300, dated Apr. 26, 2016.

* cited by examiner

WIRE HARNESS MODULE AND WIRE HARNESS MODULE MANAGEMENT SYSTEM

TECHNICAL FIELD

This invention relates to a technique to fit a wire harness to a vehicle.

BACKGROUND ART

Patent Document 1 describes a configuration in which harnesses are bundled straight, and branch harnesses are provided primarily at a front portion, a substantially intermediate portion, and a rear portion of the harnesses.

CITATION LIST

Patent Documents

Patent Document 1: JP H4-328208A

SUMMARY OF INVENTION

Technical Problem

When such harnesses are fitted to a vehicle, connectors are held by hand and connected to counterpart connectors. However, in the technique disclosed in Patent Document 1, although the connectors are attached to ends of the branch harnesses, the harnesses are flexible, and accordingly, the connectors may be located at undefined positions within an area over which the branch harnesses can bend. For this reason, it may be difficult to locate the connectors.

In addition, recently, automation using robots has been attempted in the process of fitting wire harnesses to a vehicle. In this case, it is difficult to locate the connectors in a situation where no information can be given to the robot.

To keep the connectors from freely moving around, the connectors may be fixed to a wire harness, and the wire harness may be formed in a packed shape. In the case of assembling a wire harness in such a packed shape into a vehicle, if the robot needs to unpack the packed shape and expand the entire wire harness in order to identify the connectors, unnecessary time and effort will be taken. Moreover, it is very difficult to automatically expand the wire harness in such a packed shape using a robot.

The present invention aims to provide a technique for facilitating automation of fitting a wire harness to a vehicle.

Solution to Problem

To solve the foregoing problem, a first mode is a wire harness module including a wire harness formed in a packed shape, including: a wire harness configured by bundling a plurality of electric wires; one or more connectors each attached to an end of the wire harness, the one or more connectors being attached to specific positions on the wire harness as a result of folding the plurality of electric wires; one or more fixtures for fixing the wire harness to a vehicle, the one or more fixtures being attached to specific positions on the wire harness; and an information holding unit for holding first information regarding the positions at which the one or more connectors are attached, and the positions at which the one or more fixtures are attached.

A second mode is the wire harness module according to the first mode, wherein the one or more connectors include a first connector and a second connector, and the information holding unit holds second information regarding an order in which a portion of the wire harness connected to the first connector and a portion of the wire harness connected to the second connector are laid over each other.

A third mode is the wire harness module according to the first or second mode, wherein the information holding unit includes a tag in which the first information is recorded, the tag being attached to the wire harness.

A fourth mode is a wire harness module management system for managing a plurality of wire harness modules each including: a wire harness configured by bundling a plurality of electric wires; one or more connectors each attached to an end of the wire harness, the one or more connectors being attached to specific positions on the wire harness as a result of folding the plurality of electric wires; and one or more fixtures for fixing the wire harness to a vehicle, the one or more fixtures being attached to specific positions on the wire harness, the wire harness module management system including; a client for making a request for attachment position information indicating the positions at which the one or more connectors are attached and the positions at which the one or more fixtures are attached, regarding a specific wire harness module among the plurality of wire harness modules; and a management server for acquiring the attachment position information regarding the specific wire harness module from a storage unit, and providing the client with the acquired attachment position information, in response to the request for the attachment position information from the client.

A fifth mode is the wire harness module management system according to the fourth mode, wherein the client makes the request for the attachment position information by transmitting, to the management server, identification information regarding the specific wire harness module recorded in a tag attached to the specific wire harness module, and the management server provides the client with the attachment position information corresponding to the identification information.

Advantageous Effects of Invention

With the wire harness module according to the first to third modes, the positions on the wire harness at which the connectors and fixtures are attached can be acquired based on the first information held in the information holding unit. This configuration makes it easy to specify the connectors and fixtures on an actual wire harness module. Accordingly, automation of fitting the wire harness to a vehicle is facilitated.

With the wire harness module according to the second mode, the order in which the portion of the wire harness connected to the first connector and the portion of the wire harness connected to the second connector are laid over each other can be specified based on the second information held in the information holding unit. With this configuration, the order in which the first connector and second connector are removed from the wire harness can be determined so that these portions of the wire harness are not entangled. Accordingly, the operation to attach the wire harness module to the vehicle can be performed efficiently.

With the wire harness module according to the third mode, information regarding the positions at which the connector and fixtures are attached can be acquired from the tag itself attached to the wire harness. This configuration realizes easy management of the wire harness module.

With the wire harness module management system according to the fourth mode, the attachment position information indicating the positions at which the connectors and the fixtures are attached can be acquired from the management server. This configuration makes it easy to recognize the connectors and fixtures on an actual wire harness module. Accordingly, automation of fitting the wire harness to a vehicle is facilitated.

With the wire harness module management system according to the fifth mode, the management server can provide the attachment position information corresponding to identification information, based on this identification information that is unique and is acquired from the tag itself attached to the wire harness.

DESCRIPTION OF EMBODIMENTS

Figure 1:
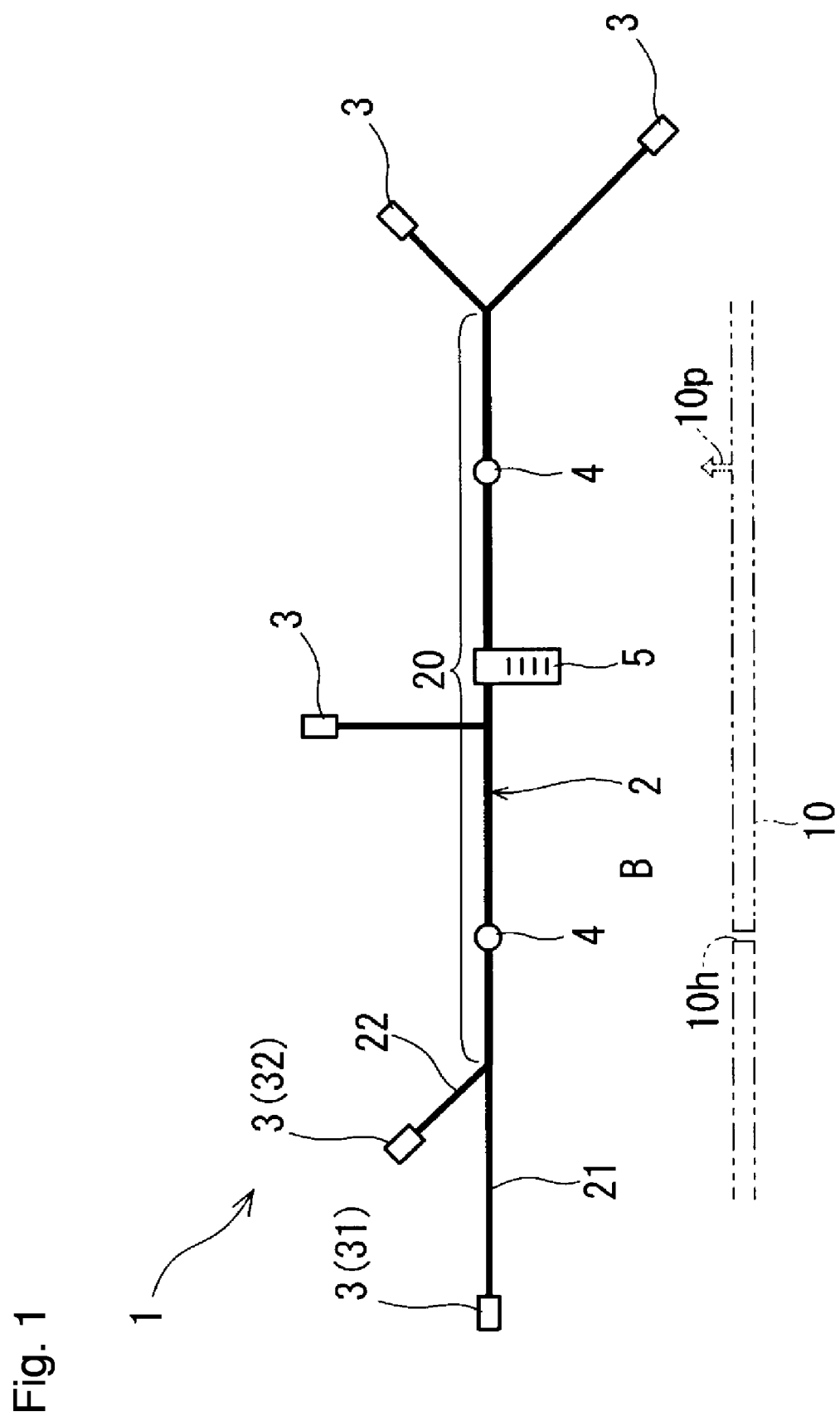
FIG. 1 is a schematic overall diagram showing a wire harness module that includes a wire harness in an expanded form according to a first embodiment.

Hereinafter, the embodiments of the present invention will be described with reference to the attached drawings. Note that the constituent elements described in these embodiments are merely examples, and are not intended to limit the scope of the invention thereto. There are cases where, in the drawings, the dimensions and number of some parts are exaggerated or simplified as required to facilitate understanding.

1. First Embodiment

Figure 2:
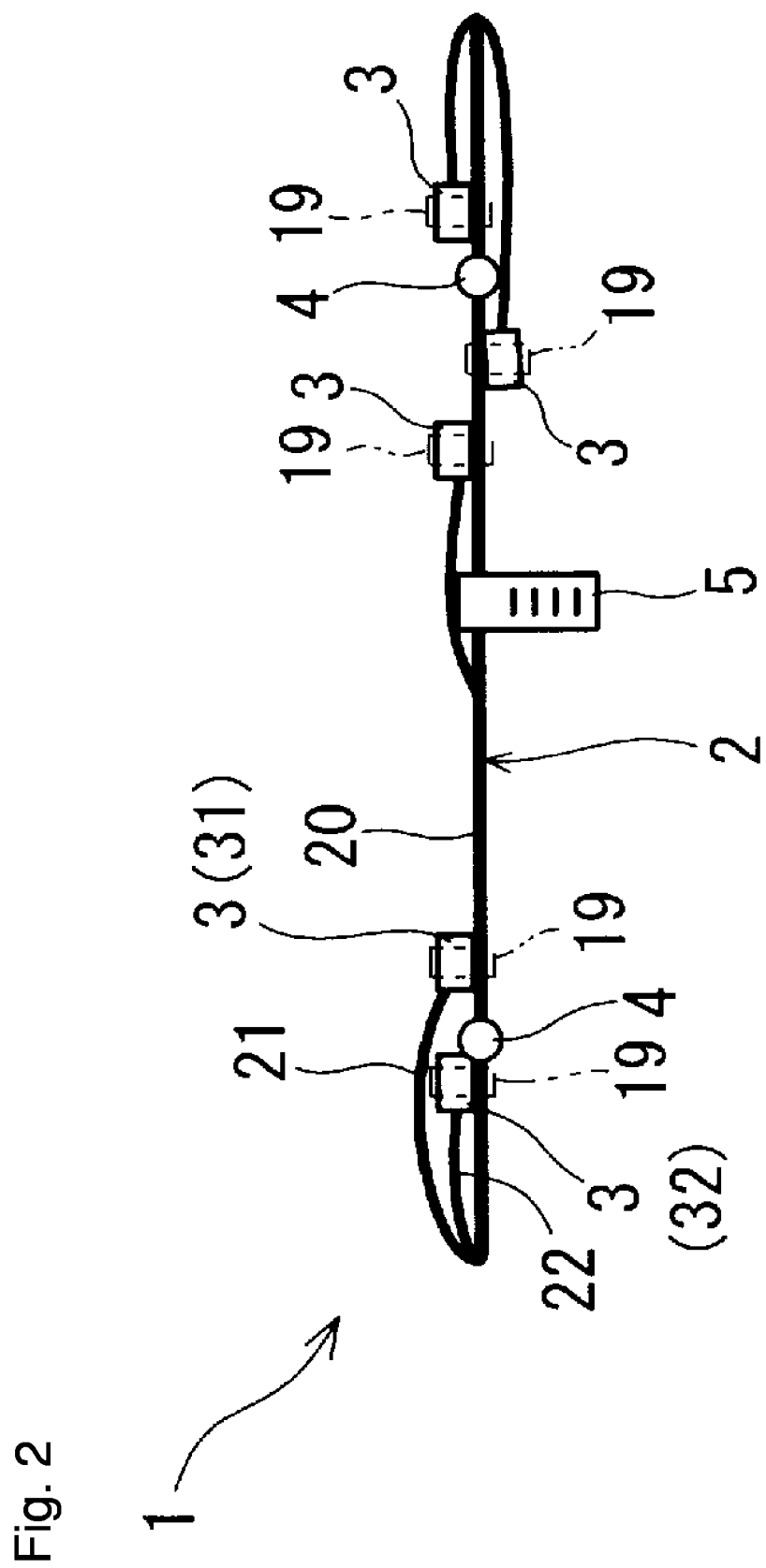
FIG. 2 is a schematic overall diagram showing the wire harness module that includes a wire harness in a packed shape according to the first embodiment.

FIG. 1 is a schematic overall diagram showing a wire harness module 1 that includes a wire harness 2 in an expanded form according to the first embodiment. FIG. 2 is a schematic overall diagram showing the wire harness module 1 that includes the wire harness 2 in a packed shape according to the first embodiment.

The wire harness module 1 includes the wire harness 2, one or more connectors 3, one or more fixtures (fitting components) 4, and a tag 5.

The wire harness 2 is formed by a plurality of electric wires being bundled. The diagrams show the outer shape of the wire harness 2 in which the plurality of electric wires are bundled. The wire harness 2 may also include other linear items, such as optical fiber cables, in addition to the electric wires. The wire harness 2 may branch into a plurality of lines in the middle in the direction in which its main line extends, but it is also possible that such branches are not present. The wire harness 2 in this example has a main line 20, and this main line 20 branches into two branch lines 21 and 22 at one end. Note that a protection member such as a tube, or a solid member for restricting its path may be attached to the wire harness 2.

The connectors 3 are attached to ends of the wire harness 2. In this example, the connectors 3 are attached to five ends of the wire harness 2. In the following description, of these five connectors 3, the connectors 3 attached to ends of the branch lines 21 and 22 will be referred to as a connector 31 and a connector 32, respectively.

The connectors 3 each have one housing, and a terminal at the end of the respective electric wires is inserted and held in a cavity of the housing of the corresponding connectors 3. Thus, the connectors 3 are attached to the ends of the wire harness 2.

The wire harness 2 in the packed shape shown in FIG. 2 is in this form when it is transported or fitted to a vehicle 10. The wire harness 2 in the packed shape is formed by folding some portions of the wire harness 2 shown in FIG. 1, so that the connectors 3 are attached to specific positions on the wire harness 2. Tape 19, for example, is used when attaching the connectors 3 to the wire harness 2. It is also conceivable to use fastening bands, rather than the tape 19, for this attachment. A configuration may also be employed in which locking components for locking the connectors 3 are provided in advance at the positions on the wire harness 2 at which the connectors 3 are attached, and the connectors 3 are fixed via these locking members. By thus forming the wire harness 2 in the packed shape, scattering of the electric wires is suppressed, enabling the wire harness 2 to be transported easily.

In the wire harness 2 in the packed shape shown in FIG. 2, the branch lines 21 and 22 are bent (folded) at the branch portions of the main line 20, and the connectors 31 and 32 are fixed to the main line 20 via the tape 19. The other three connectors 3 are also fixed to the main line 20 via the tape 19.

The fixtures 4 are members for fixing the wire harness 2 to a specific position in the vehicle 10. In this example, two fixtures 4 are attached to separate positions on the main line 20. For example, the fixtures 4 may be locking components that are locked while being prevented from coming off by being inserted into holes 10$h$ formed in the vehicle 10, or may be constituted by components in which a hole is formed and locks an attachment protrusion 10$p$ formed in the vehicle 10 while preventing this attachment protrusion 10$p$, which is inserted into the hole, from coming off.

The tag 5 is attached to the wire harness 2. Unique identification information (ID) assigned to the wire harness module 1 is recorded in the tag 5. The identification information is information that is assigned thereto at an appropriate time, such as a time when the wire harness 2 is manufactured.

It is assumed that the aforementioned identification information is recorded in the tag 5 in an electromagnetically or optically readable format, but may alternatively be recorded as human-readable information such as alphabetical characters, numbers, or symbols. The identification information may also be a production lot number, or a diagrammatic symbol (such as a barcode) indicating the production lot number, for example.

The tag 5 may be configured to be able to be readily removed from the wire harness 2 when the wire harness module 1 is fitted to the vehicle 10, or at an appropriate timing such as after the fitting.

Figure 3:
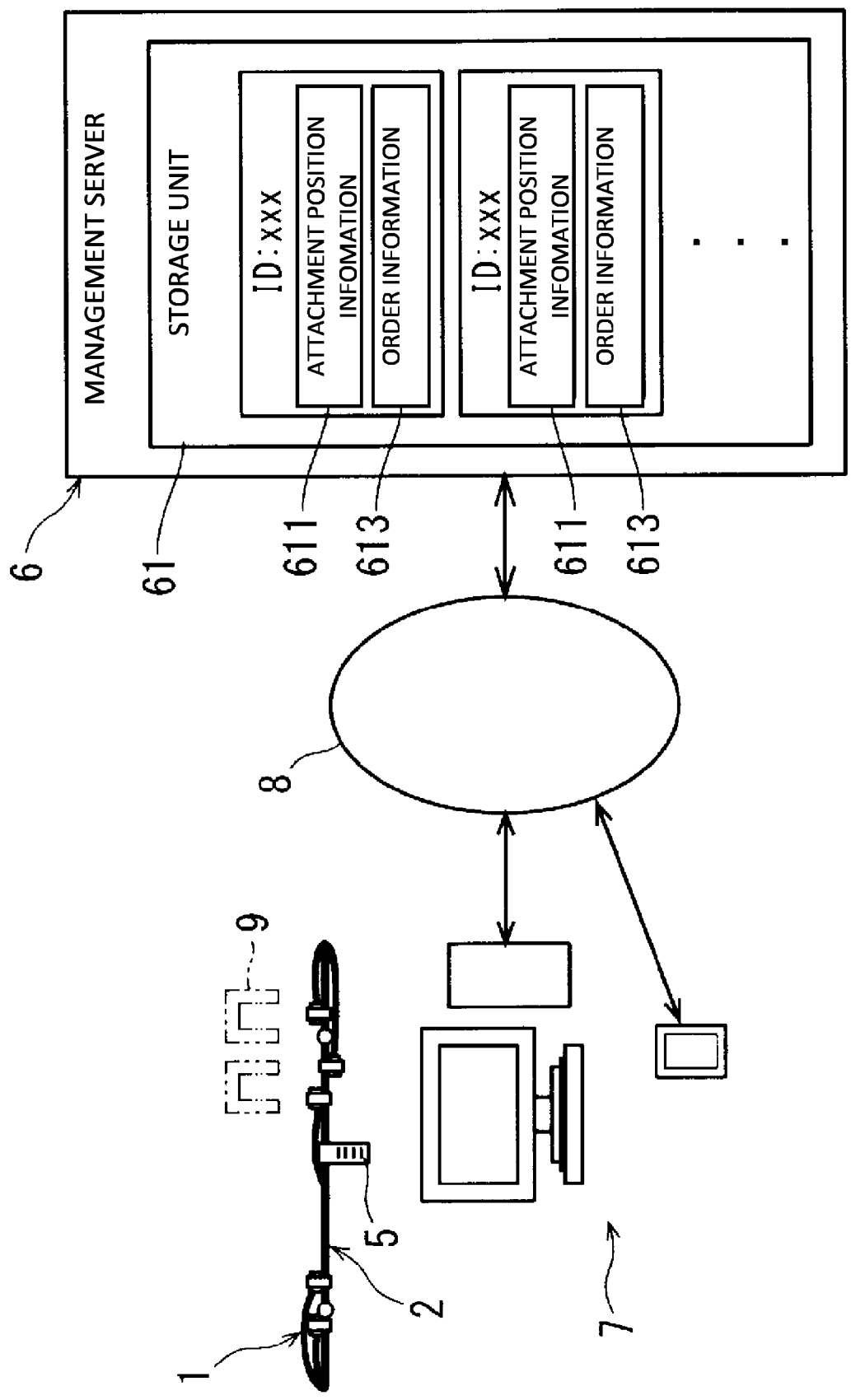
FIG. 3 is a schematic diagram showing a wire harness module management system according to the first embodiment.

FIG. 3 is a schematic diagram showing a wire harness module management system according to the first embodiment. This system is constituted by a management server 6 and a client 7. The management server 6 provides the client 7 with shape information regarding the wire harness 2 that is to be used for fitting the wire harness 2 to the vehicle 10 (including later-described attachment position information 611 and order information 613).

Specifically, the client 7 is constituted by a stationary or portable computer. The client 7 transmits the identification information recorded in the tag 5 on the wire harness module 1 to the management server 6 via a network 8. Thus, the client 7 requests the shape information to be used in assembly from the management server 6.

The management server 6 acquires, from a storage unit 61, the attachment position information 611 and order information 613 corresponding to the identification information sent from the client 7, and provides them to the client 7 via the network 8.

The attachment position information 611 is information indicating the positions at which the connectors 3 and fixtures 4 are attached to the wire harness 2 in the packed shape as shown in FIG. 2. The attachment position information 611 may be information indicating three-dimensional positions on the wire harness 2 of the connectors 3 and fixtures 4, or may be information indicating a three-dimensional relative positional relationship between the connectors 3 and fixtures 4.

The order information 613 is information indicating the order in which portions of the wire harness 2 at which different connectors 3 are connected are laid over each other, in the wire harness 2 in the packed shape. For example, as shown in FIG. 2, the branch line 21, which is connected to the connector 31, is laid over the branch line 22, which is connected to the connector 32. The order information 613 is information indicating this order in the vertical direction in which the branch lines 21 and 22 are laid over each other. Here, in this example, if the connector 32 is removed from the wire harness 2 prior to the connector 31, the branch line 22 on the lower side is entangled with the branch line 21 on the upper side. To avoid such entanglement, the connector 31 needs to be removed first to expand the branch line 21, and the connector 32 is then removed to expand the branch line 22. Thus, by acquiring, from the order information 613, the order in which the portions of the wire harness 2 are laid over each other, the order can be specified in which the connector 31 and connector 32 should be removed from the wire harness so that the branch lines 21 and 22 are not entangled with each other. As a result, the necessity for an operation to remove the entanglement of the wire harness 2 can be suppressed, and accordingly, the operation to fit the wire harness 2 to the vehicle 10 can be performed efficiently. In particular, in the case of using an automation robot 9, it is very difficult to perform the operation to remove an entanglement using the automation robot 9. For this reason, it is extremely advantageous to be able to suppress entanglement.

Upon the client 7 acquiring the attachment position information 611 and order information 613, the automation robot 9 performs the operation to fit the wire harness 2 to the vehicle 10 in accordance with the acquired information.

When the wire harness 2 is fitted to the vehicle 10 by the automation robot 9, the fixtures 4 on the wire harness 2 are roughly located, based on the attachment position information 611. Ultimately, image recognition processing is performed as appropriate using images acquired by capturing the wire harness 2 using a camera mounted in the automation robot 9, and the locations of the fixtures 4 are specified. Subsequently, the automation robot 9 fixes the specified fixtures 4 to assembly portions thereof in the vehicle 10.

Furthermore, the automation robot 9 roughly searches for the connectors on the wire harness module 1 in accordance with the position information regarding the connectors 3 recorded in the attachment position information 611. Then, ultimately, the locations of the connectors 3 are specified through image recognition processing.

Furthermore, the automation robot 9 removes the connectors 3 in order from their attachment positions on the wire harness 2 in response to the removal order that is determined based on the order information 613, and connects the removed connectors to counterpart connectors in the vehicle 10. Note that the order in which the connectors 3 are removed may be determined by the client 7 or other computers and then provided to the automation robot 9, or may be determined by a computer mounted in the automation robot 9. Note that the removal order may be determined prior to or in parallel with the aforementioned specification of the locations of the connectors 3.

Note that the attachment position information 611 may include route information indicating the route from the fixtures 4 to the connectors 3 on the wire harness 2. In this case, the locations of the connectors 3 can be readily specified by tracing the route on the wire harness 2 from the fixtures 4 fixed to the vehicle 10, in accordance with the route information. Otherwise, the order information 613 may be the aforementioned route information. If the routes from the fixtures 4 to the corresponding connectors 3 are known, it is possible to specify, based on the fixtures 4, the order in which the portions of the wire harness 2 connected to the connectors 3 are laid over each other.

In this example, based on the unique identification information assigned to the respective wire harness module 1, the attachment position information 611 and order information 613 corresponding thereto are provided from the management server 6. Accordingly, the identification information is information (first information) regarding the attachment positions of the connectors 3 and fixtures 4, and is also information (second information) regarding the order in which the portions of the wire harness 2 are laid over each other.

Here, when the wire harness 2 is formed in the packed shape, there may be cases where a larger number of wire harnesses 2 having different packed shapes are manufactured due to the attachment positions of the connectors 3 being different among manufacturers. There may also be cases where a large number of wire harnesses 2 having different packed shapes are manufactured due to the order in which the connectors 3 are attached being different. If the order in which the connectors 3 are attached is different, the order in which the portions of the wire harness 2 connected to the connectors 3 are laid over each other will be different. In this wire harness module management system, unique identification information is assigned to the respective wire harness 2, and the attachment position information 611 and order information 613 are managed in association with each other for respective identification information. Accordingly, when a specific wire harness 2 is fitted to a vehicle, the attachment position information 611 and order information 613 can be obtained based on the identification information regarding this specific wire harness 2. Accordingly, even if the packed shape is different among the wire harnesses 2 due to the difference in the positions or order at/in which the connectors 3 are attached, the positions of the connectors 3 can be readily recognized corresponding to the respective wire harnesses 2, and an appropriate removal order can be determined for the connectors. Accordingly, automation of fitting the wire harness 2 to the vehicle 10 is facilitated.

2. Second Embodiment

Figure 4:
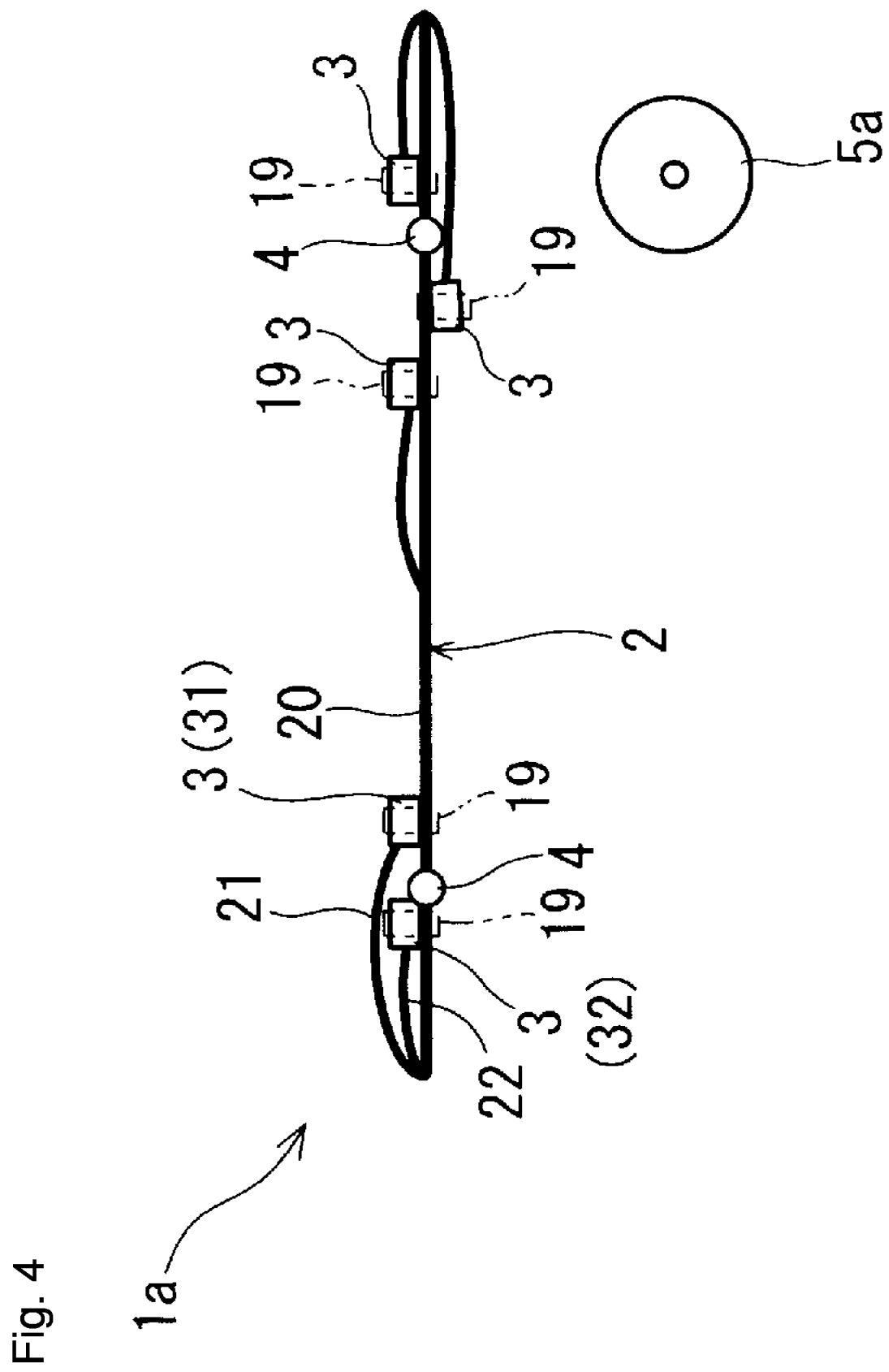
FIG. 4 is a schematic overall diagram showing the wire harness module in a packed shape according to the second embodiment.

FIG. 4 is a schematic overall diagram showing a wire harness module 1a in a packed shape according to the second embodiment. The wire harness module 1a includes a recording medium 5a.

In the recording medium 5a, the attachment position information 611 and order information 613 regarding the wire harness 2 in the packed shape are recorded in an electromagnetically or optically readable format. Therefore, when the wire harness 2 is fitted to the vehicle 10, the attachment position information 611 and order information 613 are read by a reader device from the recording medium 5a, which has been provided together with the wire harness 2 in the packed shape. The automation robot 9 fits the wire harness 2 to the vehicle 10 based on the above-read information.

Thus, in this embodiment, the attachment position information 611 and order information 613 are not provided based on the identification information as in the first embodiment. This embodiment is favorable in the case where a rule of the positions and order at/in which the connectors 3 are attached is determined, and the wire harness 2 is formed into the packed shape, thereby manufacturing a plurality of wire harnesses 2 having the same packed shape. In this case, the plurality of wire harnesses 2 having the same packed shape can be fitted to the vehicle 10, using the attachment position information 611 and order information 613 read from the one recording medium 5a. That is to say, the attachment position information 611 and order information 613 do not have to be reacquired for the respective wire harnesses 2, and accordingly, the assembly operation can be performed efficiently.

3. Modifications

Although various embodiments have been described above, the present invention is not limited to the above embodiments, and various modifications are possible.

For example, although identification information is recorded in the tag 5 in the first embodiment, the attachment position information 611 and order information 613 may also be recorded therein.

In the first embodiment, the identification information recorded in the tag 5 is used. However, the identification information does not need to be assigned to the respective wire harnesses 2, and the tag 5 may also be omitted. For example, in cases where, for example, the wire harnesses 2 are managed based on the model number, and it is guaranteed that the same model number represents the same packed shape, the identification information does not need to be assigned to the respective wire harnesses 2. In this case, the management server 6 may also provide the client 7 with the attachment position information 611 and order information 613 corresponding to the model number requested by the client 7.

The constituent elements described in the above embodiments and modifications may be appropriately combined or omitted unless any inconsistency occurs.

Although this invention has been described in detail, the above description presents examples in all aspects and does not limit this invention in any way. It would be understood that a number of modifications that have not been described as examples can be conceived without departing from the scope of this invention.

LIST OF REFERENCE NUMERALS 1, 1a Wire harness module
2 Wire harness
3 Connector
4 Fixture
5 Tag
5a Recording medium
6 Management server
7 Client
9 Automation robot
10 Vehicle
19 Tape
61 Storage unit
611 Attachment position information
613 Order information

The invention claimed is:

1. A wire harness module management system for managing a plurality of wire harness modules each including: a wire harness configured by bundling a plurality of electric wires; one or more connectors each attached to an end of the wire harness, the one or more connectors being attached to specific positions on the wire harness as a result of folding the plurality of electric wires; and one or more fixtures configured to fix the wire harness to a vehicle, the one or more fixtures being attached to specific positions on the wire harness,
the wire harness module management system comprising:
a client configured to request attachment position information indicating the positions at which the one or more connectors are attached and the positions at which the one or more fixtures are attached, regarding a specific wire harness module among the plurality of wire harness modules; and
a management server configured to acquire the attachment position information regarding the specific wire harness module from a storage, and to provide the client with the acquired attachment position information, in response to the request for the attachment position information from the client.

2. The wire harness module management system according to claim 1,
wherein the client requests the attachment position information by transmitting, to the management server, identification information regarding the specific wire harness module recorded in a tag attached to the specific wire harness module, and
the management server provides the client with the attachment position information corresponding to the identification information.

3. A wire harness module including a wire harness formed in a packed shape, comprising:
a wire harness configured by bundling a plurality of electric wires;
one or more connectors each attached to an end of the wire harness, the one or more connectors being attached to specific positions on the wire harness as a result of folding the plurality of electric wires;
one or more fixtures configured to fix the wire harness to a vehicle, the one or more fixtures being attached to specific positions on the wire harness; and
an information holder containing first information regarding the positions at which the one or more connectors are attached, and the positions at which the one or more fixtures are attached;
wherein the one or more connectors include a first connector and a second connector, and
the information holder contains second information regarding an order in which a portion of the wire harness connected to the first connector and a portion of the wire harness connected to the second connector are laid over each other.

4. The wire harness module according to claim 3, wherein the information holder includes a tag in which the first information is recorded, the tag being attached to the wire harness.

* * * * *